Feb. 21, 1956     W. E. TURVEY     2,735,369
BELLOWS PUMP
Filed July 30, 1952
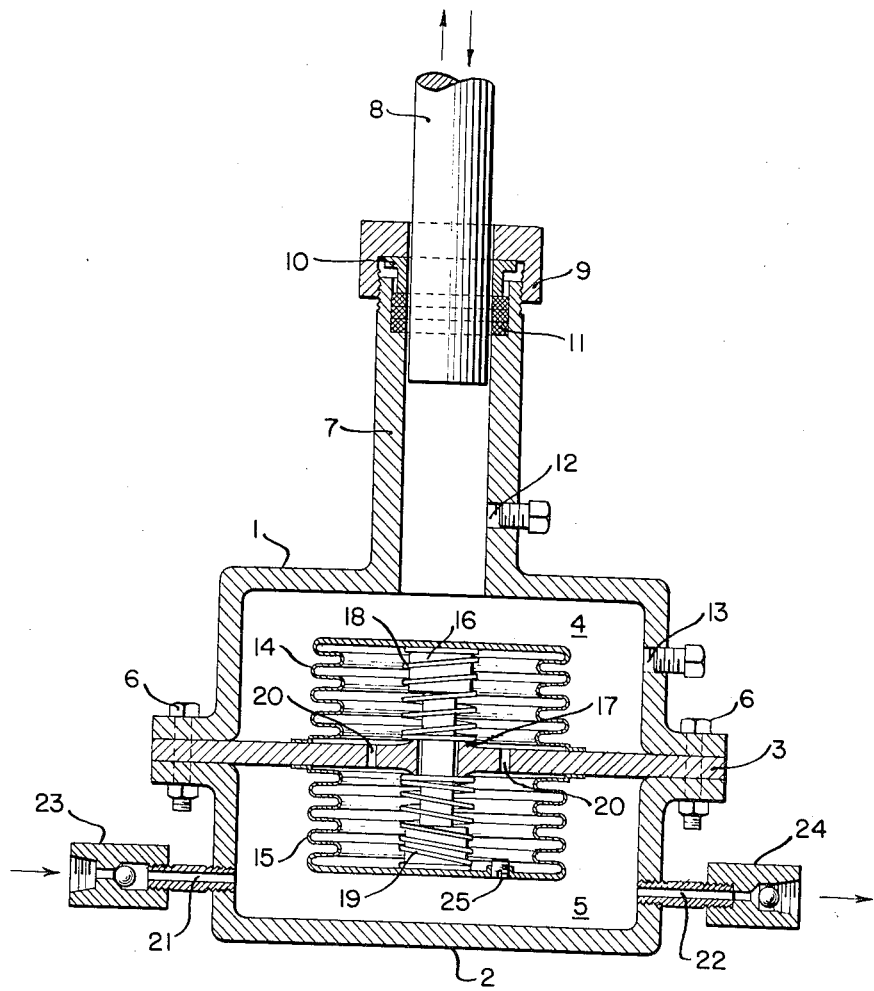
INVENTOR:
WILLIAM E. TURVEY
BY: Chester J. Giuliani
Philip T. Liggett
ATTORNEYS:

United States Patent Office 2,735,369
Patented Feb. 21, 1956

2,735,369

BELLOWS PUMP

William E. Turvey, La Grange, Ill., assignor to Universal Oil Products Company, Chicago, Ill., a corporation of Delaware Application July 30, 1952, Serial No. 301,699

9 Claims. (Cl. 103—44)

This invention relates to a modified bellows pump and more specifically to a pumping device of the surge type which precludes the fluid medium being pumped from coming into contact with a pump piston or pumping mechanisms.

The bellows type of surge pump is of particular advantage in handling corrosive or hot liquid mediums which may be damaging to the usual type of reciprocating piston and packing materials. The bellows type of pump is also of advantage in effecting the pumping of relatively small quantities of fluid at regulated flow rates. There are, of course, various present forms of surge pumps which utilize a compressible and expansible bellows member, however, most of the present types of bellows pumps are limited to quite small capacities and in general, the bellows member is incorporated into the device in a manner such that it is difficult to maintain alignment. Since a bellows member must have a relatively thin flexible wall, it is necessary to maintain good alignment and guiding to prevent excessive deformation and rupture.

The present improved type of pump makes use of a divided housing and opposing interconnected bellows means. One bellows member is housed within a liquid retaining hydraulic pressure section and is subjected to compression and expansion by the action of a piston or reciprocating member and an intervening liquid medium. An opposing bellows member connects with the aforementioned member and is housed within a fluid pumping section so that the two members work simultaneously. Briefly, the present improved pumping apparatus comprises in combination, a pump housing having an internal dividing partition forming a liquid retainng hydraulic pressure section and a fluid pumping section, a reciprocating piston member connective with the hydraulic pressure section, an expansible and compressible bellows member connecting with and sealed to the dividing partition within the hydraulic pressure section and an opposing bellows member connecting with and sealed to the dividing partition in the pumping section, a connecting rod extending through the dividing partition within the bellows members and connecting to the end portions of each of the opposing bellows members, fluid inlet and outlet ports connecting with the fluid pumping section and check valve means at said ports whereby a fluid medium may be drawn into and discharged from the pumping section responsive to the displacement action of the reciprocating piston member connecting with the hydraulic section and the accompanying displacement of the bellows members in each of the dividing sections.

It is a particular advantage of the present device to maintain a liquid medium between the piston member and the bellows member so that there is action of a liquid column on the bellows member rather than a direct mechanical metal to metal contact. In other words, the hydraulic pressure of the liquid medium provides a direct action, but at the same time a cushioning effect, causing the compression and expansion of the bellows member.

It is also a particular feature of the present improved bellows pump to utilize a split bellows or opposing bellows members and an internal connecting rod therebetween which may be guided. The connecting rod extends through the dividing partition of the pump housing, causing one bellows member to expand as the other is compressed and vice versa, however, the connecting rod may pass through suitable passageway or bearing zone such that there may be good alignment and guiding of the connecting bellows members. For high pressure service, a substantially non-compressible liquid medium may be maintained within the bellows members themselves to prevent rupture or collapse of the thin bellows walls.

Additional features and advantages of the pumping device will be noted in connection with the accompanying drawing and the following description thereof.

Referring now specifically to the drawing, there is shown a divided pump housing formed by flanged section 1 and another flanged section 2. Connected between the two sections is a dividing partition member 3 which in turn forms within the pump housing a liquid retaining hydraulic pressure section 4 and a pumping section 5. In the particular embodiment illustrated, the housing and dividing partition 3 are bolted around the periphery of the housing by suitable bolting means 6, however, other usual forms of clamping or bolting may be employed to maintain a pressure tight housing.

Connecting with the end portion of the hydraulic pressure section 4 is a piston chamber 7 which in turn has extending into the interior thereof a reciprocating piston member 8. The latter may be moved back and forth within the chamber 7 by any suitable prime mover and by means of a crank arm, cam, or the like, not illustrated in the present drawing. A suitable packing gland is provided around the piston member 8 at the end of the chamber member 7 by means of a clamp ring 9, lantern ring 10 and packing 11. The latter is maintained within a suitable groove or recessed portion at the end of the chamber 7. A suitable relatively noncompressible liquid medium is maintained within the hydraulic pressure section 4 and within the interior of the piston chamber 7 such that the piston member 8 may exert its reciprocating action on a liquid column extending between the internal end of the piston member 8 and the bellows member within the section 4. The liquid medium may comprise water, oil, glycerin, or the like, and the liquid medium may be introduced and withdrawn periodically, or as may be necessary, through the plugged inlet and outlet means indicated respectively as 12 and 13.

On one side of the dividing partition member 3 is a bellows member 14 and on the opposing side of the partition a second bellows member 15. Each of the bellows members are welded or otherwise tightly connected to and sealed with the partitioning member 3 such that no liquid can enter the interior portions of the bellows members. Within the bellows members and extending through the partitioning member is a connecting rod 16 which in turn contacts or connects with the interior end portions of each of the bellows members 14 and 15. Thus, as one bellows member is compressed the opposing member is expanded, or alternatively, as one member is caused to expand, the opposing member must compress. The connecting rod or shaft 16 is suitably guided through a relatively close fitting opening 17 within the dividing member 3. Preferably, the shaft opening 17 is of extended length in the manner of a journal or bearing, providing good axial alignment and guiding action of the connecting rod member 16. The present embodiment also provides a spring member 18 within the bellows member 14 and a spring member 19 within bellows member 15 such that the bellows members may be aided in returning to their expanded form. Also, suitable pressure equalizing holes 20 are provided within plate 3 and within the zone of the bellows members so that the latter may readily compress and expand alternatively with the operation of the pump without any opposing effect from the internal pressure within each bellows member. The fluid medium within the bellows either liquid or gaseous, is allowed to surge back and forth through holes 20 as the bellows members alternately compress and expand.

Connecting with the pumping section 5 is a fluid inlet port 21 and a fluid outlet port 22 such that the reciprocating action of the bellows member 15 may cause the intermittent pumping of a fluid medium into and through section 5. The inlet port 21 is provided with a suitable ball check means 23 permitting the intake of the fluid medium into section 5 while the outlet port 22 has connecting therewith a suitable ball check means 24 which will permit the discharge of a fluid medium from the section 5. While the drawing shows single ball check valve means in connection with the inlet and outlet ports, it is to be noted that double ball check valves or any standard type of check valve means may be utilized in connection with the pump section.

During the operation of the pumping device, the particular fluid medium to be pumped is drawn into the chamber 5 as the bellows member 15 is compressed and is pulled inwardly towards the partitioning member 23, while conversely, the fluid medium is pumped out of the chamber 5 through port 22 and check valve means 24 as the bellows member 15 is expanded and elongated. The bellows member 15, of course, acts directly responsive to the action of the connecting rod 16 and the bellows member 14. The bellows 15 expands as bellows 14 compresses, and alternatively bellows 15 compresses as the bellows 14 is caused to expand. Bellows member 14 in the hydraulic pressure section 4 is compressed and expanded responsive to the hydraulic pressure exerted from the liquid medium maintained in section 4 and the release of pressure on the liquid medium, as caused respectively by the inward and outward movement of the piston member 8 within chamber 7.

The present embodiment indicates also that the connecting rod member 16 has a smaller diameter central portion extending through the bearing section 17 of plate 3, or in other words, that the rod member has enlarged end portions connecting with each of the opposing bellows members, so that the enlarged end portions act as stop members limiting the reciprocating axial movement of the connecting rod and at the same time limiting the extent of the expansion or compression of the connecting bellows members 14 and 15, so that the latter are not overextended and ruptured.

The bellows members may be formed of a relatively thin metal or of a suitable plastic material, or any flexible medium capable of withstanding repeated flexure. The design of each bellows member must also be such as to withstand the particular pressure conditions within each section of the pumping unit. In other words, the thickness of the walls and the configuration of the corrugations must be considered in the design of each bellows member for the particular service of the pump with respect to pressures that are to be encountered. Also, the metal or material comprising the bellows members, as well as the material comprising the housing section 2 and dividing plate 3 forming the pumping section 5 must be resistant to the possible corrosive properties of the liquid medium passing through the pumping zone 5. The design of the pump is, of course, such that the fluid medium being pumped is precluded from entering into the zone of the piston 8 and the packing gland at the end of the piston chamber 7. Where a liquid medium is to be utilized within the bellows sections 14 and 15, as noted hereinbefore, such medium may be introduced through removable plug 25, in the end of section 15, and thus be available for flow back and forth between bellows sections, by way of the internal holes 20.

I claim as my invention:

1. A pumping apparatus comprising in combination, a pump housing having an internal dividing partition forming a liquid retaining hydraulic pressure section and a fluid pumping section, a reciprocating piston member extending into a portion of said hydraulic pressure section, an expansible and compressible bellows member connecting with and sealed to said dividing partition on one side of the latter within said hydraulic pressure section and an opposing bellows member connecting with and sealed to the dividing partition in the pumping section, a connecting rod extending through said dividing partition and connecting to each of said bellows members, fluid inlet and outlet ports connecting with said fluid pumping section and check valve means at said ports whereby a fluid may be drawn into and discharged from said pumping section responsive to the displacement action of said reciprocating piston member within said hydraulic section and the accompanying displacement of the bellows member in each of said divided sections.

2. A pumping apparatus comprising in combination, a pump housing having an internal dividing partition forming a liquid retaining hydraulic pressure section and a fluid pumping section, an elongated piston chamber extending from and connecting with said hydraulic pressure section, a reciprocating piston member extending into said piston chamber, opposing expansible and compressible bellows members connecting with and sealed to opposing sides of said internal dividing partition, a rigid connecting rod within and attached to said bellows members extending through said dividing partition, inlet and outlet ports connecting with said pumping section and opposingly acting check valve members connecting with said ports whereby fluid may be drawn into and discharged from said pumping section responsive to the reciprocating action of said piston member and the corresponding displacement action of said bellows members in each of said sections.

3. The apparatus of claim 2 further characterized in that compression springs are positioned internally within each of said bellows members around said connecting rod, whereby said bellows members are aided in maintaining an expanded position.

4. A pumping apparatus comprising in combination, a sectional pump housing having at least two housing portions and an internal dividing partition forming a liquid retaining hydraulic pressure section and a fluid pumping section, removable clamping means joining said housing portions and holding said dividing partition therebetween, an elongated piston chamber extending from and connecting with said hydraulic pressure section, a reciprocating piston member extending into said piston chamber, opposing expansible and compressible bellows members connecting with and sealed to opposing sides of said internal dividing partition, a rigid connecting rod within and attached to said bellows members extending through said dividing partition, fluid inlet and outlet ports connecting with said pumping section and opposingly acting check valve members connecting with said ports whereby fluid may be drawn into and discharged from said pumping section responsive to the reciprocating action of said piston member and the corresponding displacement action of said bellows members in each of said sections.

5. The apparatus of claim 4 further characterized in that said connecting rod has enlarged end portions and a smaller diameter center portion adapted to slide within said internal dividing partition, and said enlarged end portions of said connecting rod provide stops for the reciprocating motion of said connecting rod through said partition.

6. A pumping apparatus comprising a housing, an internal partition dividing the housing into a pair of compartments, an expansible and compressible bellows member in each of said compartments connected and sealed to opposite sides of said partition, a connecting rod within and attached to said bellows members and extending through and slidable with respect to said partition, means for compressing and expanding the bellows member in one of said campartments whereby to expand and compress the bellows member in the other of said compartments, and check valve inlet and outlet means connected to said other compartment.

7. In a pumping apparatus, the combination of a pumping compartment having a wall provided with an opening therethrough, an expansible and compressible bellows member in said compartment connected and sealed to one side of said wall, an opposing expansible and compressible bellows member connected and sealed to the other side of said wall, a connecting rod within and attached to said bellows members extending through and slidable in said opening in said wall, means for compressing and expanding the second-mentioned bellows member whereby to expand and compress the first-mentioned bellows member in said compartment, and check valve inlet and outlet means connected to said compartment.

8. A pumping apparatus comprising a housing, an internal partition dividing the housing into a pair of compartments, said partition having an opening therethrough, an expansible and compressible bellows member in each of said compartments connected and sealed to opposite sides of said partition, a connecting rod within and attached to said bellows members and having a center portion extending through and slidable in said opening and having enlarged end portions of greater diameter than said opening, means for compressing and expanding the bellows member in one of said compartments whereby to expand and compress the bellows member in the other of said compartments, and check valve inlet and outlet means connected to said other compartment.

9. A pumping apparatus comprising a housing, an internal partition dividing the housing into a pumping compartment and a liquid-retaining hydraulic pressure compartment, an expansible and compressible bellows member in each of said compartments connected and sealed to opposite sides of said partition, a connecting rod within and attached to said bellows members and extending through and slidable with respect to said partition, a reciprocating piston member extending into a portion of said hydraulic pressure compartment for compressing and expanding the bellows member in the last-mentioned compartment whereby to expand and compress the bellows member in the pumping compartment, and check valve inlet and outlet means connected to the pumping compartment.

References Cited in the file of this patent

UNITED STATES PATENTS

| | | |
|---|---|---|
| 1,389,635 | Dunkle | Sept. 6, 1921 |
| 1,395,496 | Hunt | Nov. 1, 1921 |
| 1,708,306 | Giesler | Apr. 9, 1929 |
| 1,769,044 | Stevens | July 1, 1930 |
| 2,613,607 | Sheen | Oct. 14, 1952 |